Feb. 17, 1959 T. A. BROOKE ET AL 2,873,940
ANTI-VIBRATION MOUNTING
Filed July 2, 1956 2 Sheets-Sheet 2
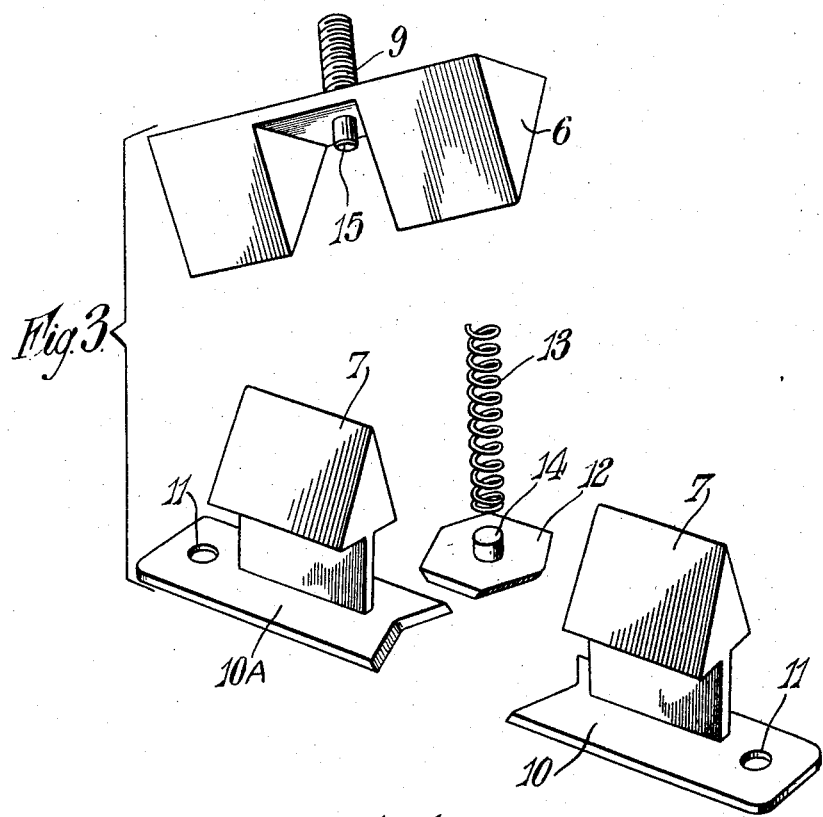
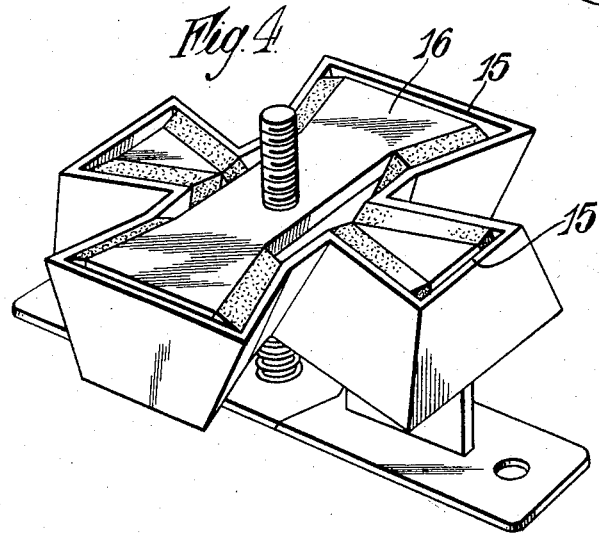
INVENTORS
Thomas Andrew Brooke
Eric James Smith
by Benj. T. Rauber
their attorney United States Patent Office 2,873,940
Patented Feb. 17, 1959

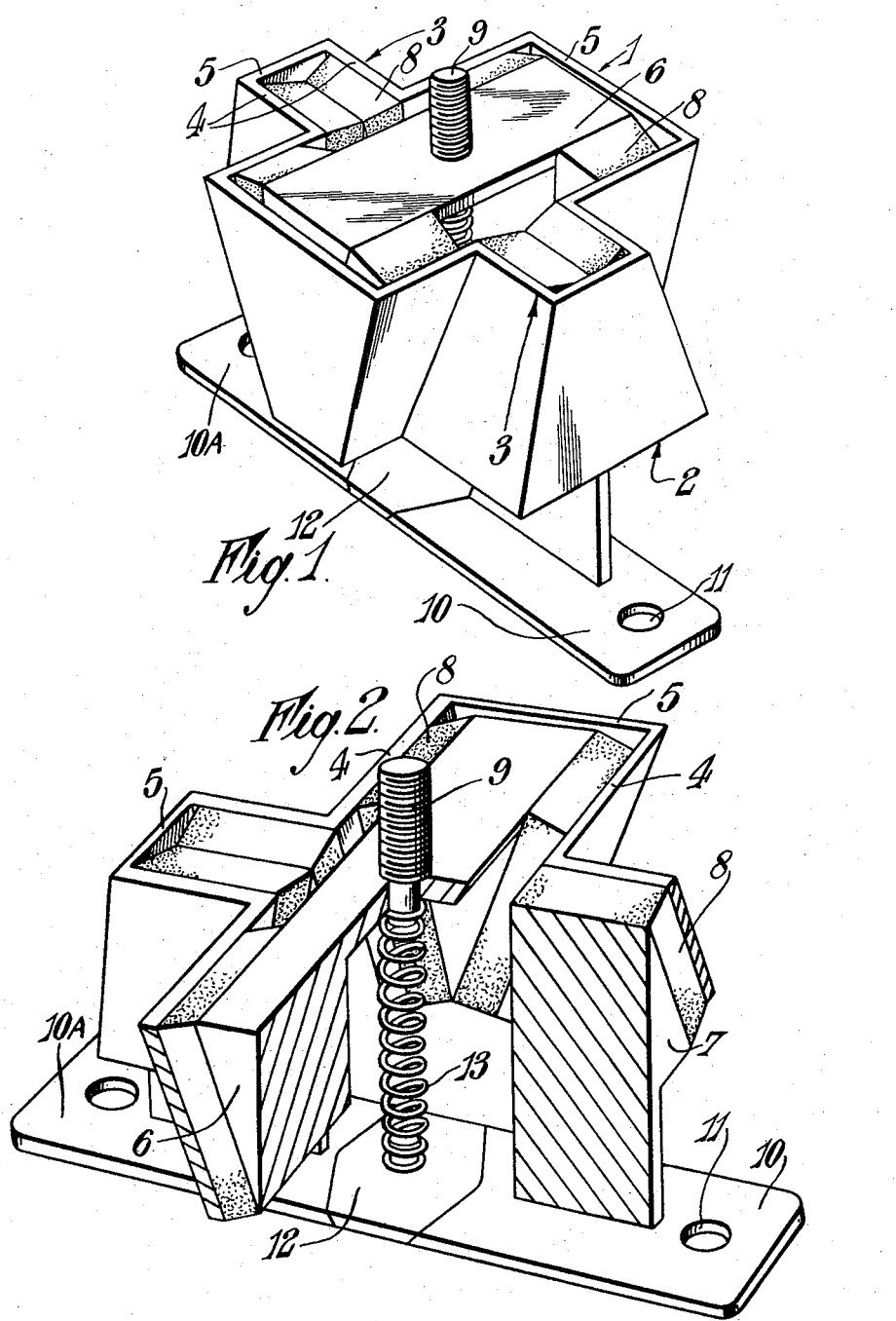

2,873,940

ANTI-VIBRATION MOUNTING

Thomas Andrew Brooke, Halewood, near Liverpool, and Eric James Smith, Wallasey, England, assignors to Dunlop Rubber Company Limited, London County, England, a British company Application July 2, 1956, Serial No. 595,551

9 Claims. (Cl. 248—358)

This invention relates to anti-vibration mountings for use mainly in mounting aircraft instruments, and is concerned with the provision of an improved mounting of this kind which is of relatively simple construction and efficient to use.

In our invention an object supporting, wedge-shaped, element is positioned with its converging surfaces projecting downwardly crosswise of a wedge-shaped support having its converging surfaces projecting upwardly, within an open frame of cruciform section, the inner surfaces of the frame opposed to the converging surfaces of the support and element converging upwardly and downwardly, respectively, and blocks of resilient elastomeric material, such as rubber, are placed between the opposed converging surfaces of the frame and of the support and element. These opposed surfaces may be parallel. This arrangement is such that vertical and horizontal stresses in all directions between the support and the supported object are received by the resilient elastomer and resisted by shear stress in the elastomer.

Both or either of the support and element may be cut away or divided at the vertical zone of their intersection and a spring acting vertically at the line of intersection may be placed between the support and the element to decrease the stresses on the elastomer and to increase the load carrying capacity of the mounting. The element and support and the arms of the frame may be tapered in horizontal section so that movement of the supported object in any direction may be resisted by compression stresses in some or all of the elastomer between the frame and the support and supported element.

For a better understanding of the invention and to show how it may be carried into effect, the same will now be described with reference to the accompanying drawings, wherein:

Figure 1 is a perspective view of an anti-vibration mounting constructed in accordance with the present invention, Figure 2 is a further perspective view of the mounting having part of its construction shown in section, Figure 3 is an exploded view of the central non-resilient parts of said mounting, and Figure 4 is a perspective view of a modified form of anti-vibration mounting.

In the embodiment shown in Figures 1 to 3 a mounting comprises a cruciform frame having a pair of wedge-shaped channel members 1, 2 arranged at right angles one to the other. Each channel member is defined by a pair of longitudinally spaced wall parts 3, each of said wall parts comprising two metal strips 4 inclined towards each other. Each strip is formed integrally with an associated strip of the channel member disposed at right angles thereto to provide a substantially L-shaped "floating" element, said mounting being constituted by four such elements arranged in the form of a cross. The extremities of said elements are interconnected by flat joining plates 5 thereby forming one continuous outer element. An upper, wedge-shaped support or member 6 and a lower, wedge-shaped support 7, formed in two separate pieces both of a rigid material such as metal are mounted one within each channel member with its inclined outer surface in parallel relationship to the corresponding wall parts of the associated channel member by means of resilient natural or synthetic rubber blocks 8 interposed between and bonded to adjacent surface parts of the two members. Both wedge-like members are provided with a middle cut-away portion to permit relative displacement therebetween without one fouling against the other, the lower wedge-like support 7 being, in fact, formed in two separate pieces as shown in Figure 3. The support is also provided with means for securing to one of two relatively displaceable elements, the movement of which is to be damped. In the case of member 6 this is constituted by a threaded spindle 9 and in the case of support 7 by a flanged base formed in two spaced parts 10, 10A each provided with a bolt hole 11. As shown in Figure 3 a spring engaging plate 12 of hexagonal configuration fits snugly between adjacent angular extremities of the two spaced parts 10, 10A, associated edges of the plate and spaced parts being suitably chamfered to key the assembly together. Finally, a metal compression spring 13 is mounted intermediate each wedge-like member and within the opening defined by the two central cut-away portions, said spring engaging a projecting boss 14 on the plate 12 and a similar boss 15 on wedge-like member 6. The purpose of this spring is to reduce the stresses in the blocks 8 for any given load and to increase the load-carrying capacity of the mounting. It also counteracts any permanent set that may arise in the rubber blocks.

Normally the mounting is disposed with the wider openings of one arm of the frame directed upwardly. In this respect it will be appreciated that a load applied to say the upper support 6 will cause the latter to deflect downwardly with respect to the L-shaped elements constituting the two channel members of the frame, and said elements to move downwardly with respect to the lower support 7. The net effect is that the support 6 as moved with respect to the support 7 thus causing the rubber blocks 8 to operate in combined compression and shear. By modifying the angle of inclination of the wall parts the ratio of shear to compression of the rubber may be varied. As previously mentioned, the compression spring 13 is utilized to counteract permanent set that may arise in the rubber blocks.

Each wedge-like support 7 may be also displaced longitudinally of its associated channel-member of the frame under the action of a horizontal load. Should, for example, a force be acting on the upper wedge-like support 6 in a direction longitudinally thereof, then the latter will shear its mounting rubbers horizontally with respect to the inner surface of those L-shaped floating portions of the frame constituting its associated channel member. In addition, the force transmitted to said floating portions will cause the rubbers disposed on one side of the second channel member 2 of the frame to operate in compression with respect to the support 7, while the rubbers arranged on the other side of the second channel member are caused to operate in tension with respect to said support 7. The movement of the rubbers in the second channel member will be approximately one-third of that due to the rubbers of the first channel member. This is because the modulus in shear of the rubber is approximately one-third of the modulus in compression and tension. Finally, should the same force be applied to the upper wedge-like support 6 but in a direction laterally thereof, the force will cause the rubbers disposed on one side of the first channel member 1 of the frame to operate in tension, while the rubbers arranged on the other side of said channel member are caused to operate in compression. The force transmitted to the floating portions constituting the first channel member will cause the rubbers of the second channel member 2 to operate in shear. These two movements give the total movement which will be the same as in the first example concerning the longitudinal movement. Forces in other directions can all be vectorially resolved and thus the mounting is flexible in all directions.

As stated above it is preferred that the wedge-shaped supports and arms of the frame should be tapered in two directions at right angles so that the resilient blocks act in combined compression and shear while under the action of either a vertical or a horizontal load. The use of rubber or other resilient material in shear and compression has the advantage that it tends to increase the life of the rubber. An anti-vibration mounting having this property is of similar construction to the foregoing embodiment with the exception that each channel member and inner member is tapered outwardly towards its ends in a horizontal direction as shown in Figures 4 and 5. The arrangement of the L-shaped floating elements in this instance resembles a Maltese cross and as before the extremities of said elements are interconnected by flat joining plates 15 thereby forming one continuous outer element. As with the previous embodiment a vertical load will cause the rubber blocks interposed between each channel member and inner member to operate in combined compression and shear. In addition, however, a force acting on, for example, the upper wedge-like member 16 in a direction longitudinally thereof will cause the rubbers at one extremity of the associated channel member to operate in shear and compression combined, and the rubbers at the extremity of said other channel member to operate in shear and tension. It will be understood that this mounting will operate in all directions in both shear and compression, the respective amounts of which are determined according to the angle of inclination of the wall parts and the resilient material used. The mounting construction gives load/deflection characteristics with progressive spring rates and caters for occasional and accidental overloading in all directions.

Having now described our invention—what we claim is:

1. An anti-vibration mounting comprising a plate adapted to be attached to a supporting surface, a pair of spaced wedge-shaped supports having upwardly converging surfaces projected from said plate, a second plate adapted to be attached to a supported object, a pair of spaced, wedge-shaped elements having downwardly converging surfaces projected from said second plate and said elements being disposed at right angles to said supports with the spaces between the supports and elements oppositely disposed; an open frame of cruciform section having walls surrounding the supports and elements in spaced relation to the surfaces thereof, the walls of said frame being parallel to the surfaces of the supports or elements adjacent thereto and blocks of resilient material filling the spaces between the walls and the converging surfaces of the respective supports or elements.

2. An anti-vibration mounting comprising a plate adapted to be attached to a supporting surface, a lower wedge-shaped support having upwardly converging surfaces projecting from said plate, a second plate adapted to be attached to a supported object, an upper wedge-shaped support having downwardly converging surfaces projected from said second plate, the lines of intersection of the converging surfaces of said upper support and said lower support lying in vertical planes crossing at a right angle at the mid point of each support, at least one of said supports being recessed at said mid point to permit relative vertical movements of said supports; an open frame of cruciform section having walls surrounding said supports in spaced relation to the converging surfaces thereof, the inner surfaces of said frame opposite the converging surfaces of said lower support converging upwardly and the inner surfaces of said frame opposite the converging surfaces of said upper support converging downwardly, and blocks of resilient material spanning the spaces between, and secured to, the walls of said frame and the respective converging surfaces of said supports.

3. An anti-vibration mounting comprising a plate adapted to be attached to a supporting surface, a pair of aligned, spaced, wedge-shaped lower supports having upwardly converging surfaces projected from said plate, a second plate adapted to be attached to a supported object, a pair of aligned, spaced, wedge-shaped upper supports having downwardly converging surfaces projected from said second plate, the line of intersection of the converging surfaces of said upper supports crossing the line of intersection of the converging surfaces of said lower supports at right angles to each other at the spaces between said upper and lower supports; an open frame of cruciform section having walls surrounding both said supports and spaced from the surfaces of said supports, the inner surface of said frame opposite the converging surfaces of said lower support converging upwardly and the inner surfaces of said frame opposite the converging surfaces of said upper support converging downwardly, and blocks of resilient material spanning the spaces between, and secured to, the walls of said frame and the opposed converging surfaces of the respective supports.

4. The mounting of claim 3 having a spring confined between said plates in the space between said aligned, spaced, upper supports and said aligned, spaced, lower supports.

5. The mounting of claim 4 in which said spring is a coil spring.

6. The mounting of claim 4 in which the arms of said cruciform frame are of uniform width in horizontal section.

7. The mounting of claim 4 in which the horizontal section of the supports and of the arms of said frame flare to a wider dimension toward their free ends.

8. An anti-vibration mounting for aircraft instruments and other articles comprising a lower wedge-shaped support having surfaces converging upwardly, an upper wedge-shaped support positioned crosswise of said lower support and at right angles thereto to support an object and having its surfaces converging downwardly, at least one of said supports being recessed at the place of crossing an intermediate stress transmitting element having a cruciform space with arms having surfaces complementary to and spaced from the converging surfaces of said upper and lower supports, and resilient blocks of elastomeric material spanning the spaces between, and secured to, the complementary surfaces of said intermediate stress transmitting element and said supports.

9. The anti-vibration mounting of claim 8 in which the complementary surfaces of said supports and said intermediate stress transmitting element flare transversely toward their outer ends.

References Cited in the file of this patent

UNITED STATES PATENTS 2,676,774   Hirst _____ Apr. 27, 1954